UNITED STATES PATENT OFFICE.

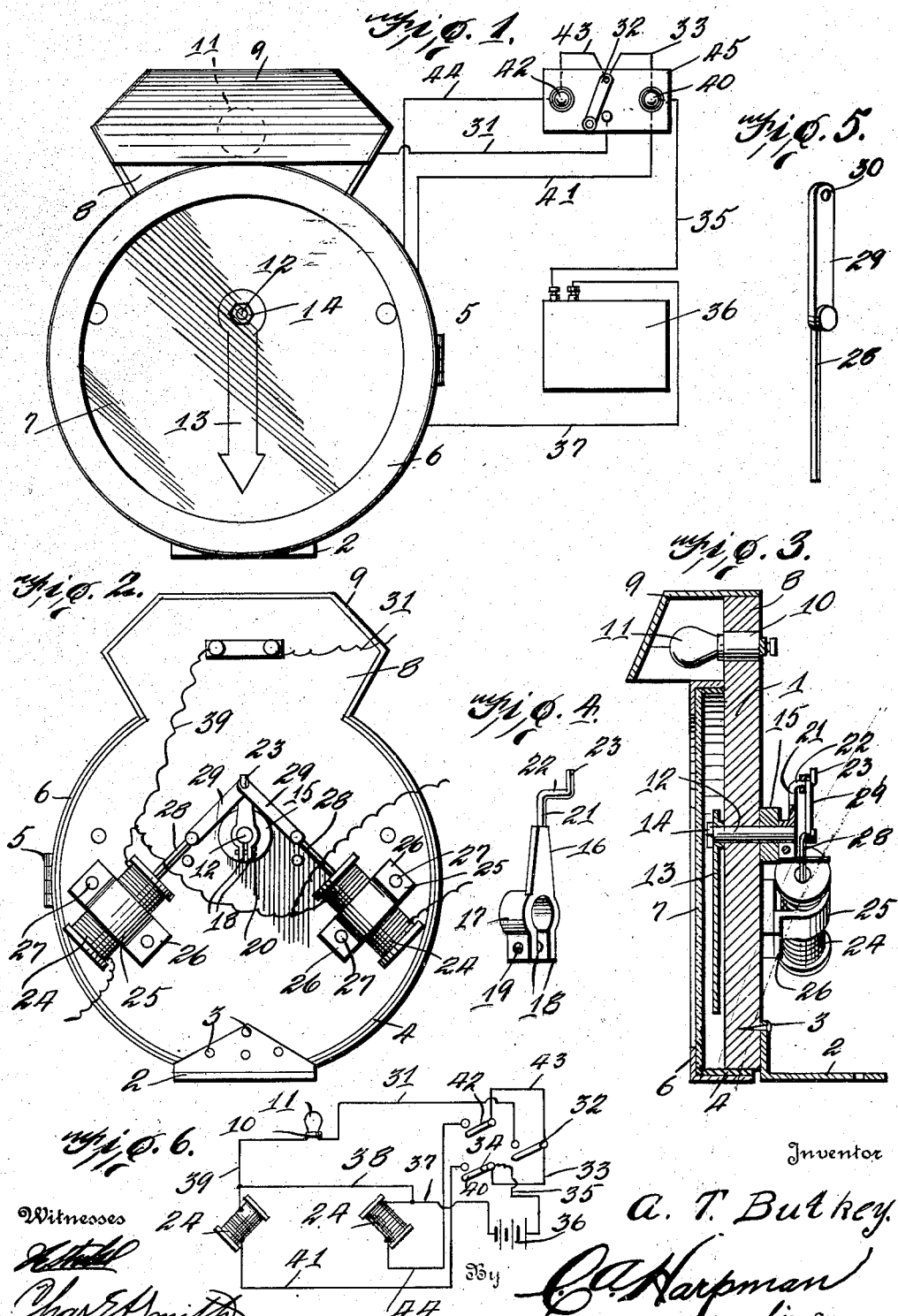

ANDREW T. BUTKEY, OF YOUNGSTOWN, OHIO.

SAFETY-LAMP AND DIRECTION-INDICATOR FOR VEHICLES.

1,187,038.　　　　　Specification of Letters Patent.　　Patented June 13, 1916.

Application filed October 6, 1915.　Serial No. 54,401.

*To all whom it may concern:*

Be it known that I, ANDREW T. BUTKEY, a citizen of the United States of America, residing at Youngstown, in the county of Mahoning and State of Ohio, have invented certain new and useful Improvements in Safety-Lamps and Direction-Indicators for Vehicles, of which the following is a specification, reference being had therein to the accompanying drawing.

This invention relates to a safety lamp and direction indicator for vehicles and has for its principal object the production of a simple and efficient device by means of which the operator of the vehicle, such for instance as an automobile, may easily indicate the direction in which he is about to turn the vehicle.

Another object of this invention is the production of a device wherein the indicator is adapted to be run or operated by electrically controlled means so that the operator of the vehicle may easily cause the indicator to be shifted in a desired direction for providing a sufficient and desired warning when necessary.

With these and other objects in view this invention consists of certain novel combinations, constructions, and arrangements of parts as will be hereinafter fully described and claimed.

In the accompanying drawing: Figure 1 is a front elevation of the device, showing the wiring therefor in plan. Fig. 2 is a rear elevation of the indicator. Fig. 3 is a central vertical section through the safety lamp and direction indicator. Fig. 4 is a detail perspective view of a certain arm used in connection with this device. Fig. 5 is an enlarged detail perspective view of a certain pitman and core used in connection with this invention. Fig. 6 is a diagrammatic view of the wiring used for operating the safety lamp and direction indicator.

Referring to the accompanying drawing by numerals it will be seen that the safety lamp and direction indicator for vehicles comprises a supporting back 1 through which the bracket 2 is secured by means of tacks or other securing means 3, whereby the back 1 may be easily and efficiently supported upon any desired portion of an automobile or other vehicle. An annular ring 4 is fitted upon the back 1 and to this ring 4 there is secured by means of the hinge 5 a cap 6. The glass front 7 is mounted within the cap 6 so that when the cap is in a closed position fitting upon the ring as shown in Figs. 1 and 3, the glass 7 will form a closure for the forward portion of the ring 4, although this glass front will be carried at a spaced distance from the forward face of the back 1. This back 1 is further provided with an upstanding projection 8 at its upper end, as clearly shown in Figs. 1 and 2, and upon this projection 8 there is carried an overhanging hood 9. A socket member 10, having a lamp 11 is carried by the projections 8 so as to allow the lamp 11 to be carried above the hood 9 as shown clearly in Fig. 3. This lamp 11 is directly above the upper portions of the ring, cap, and glass, and, therefore, when the lamp is burning the rays of light will be reflected from the hood 9 upon the forward face of the back 1 within or behind the glass front 7.

A shaft 12 is rotatably mounted adjacent the central portion of the back 1 and extends entirely through the back 1, as clearly shown in Fig. 3. The indicator 13 is mounted upon the shaft 12 and is held in position by means of the nut or head 14 carried by the forward end of the shaft 12. Therefore, it will be seen that when the shaft 12 is rotated in either direction the indicator will be swung in the desired direction. A spacing block 15 is carried upon the shaft 12 adjacent its rear end, although the shaft projects for a considerable distance beyond this spacing block. It will be seen that this spacing block 15 bears upon the rear surface of the back 1 and, therefore, will provide a broad bearing surface so as to allow the shaft to freely rotate without undue binding action taking place upon the back 1. The arm 16 is provided with an enlarged drum 17 having parallel spaced ears 18 in which there are formed threaded openings 19 in alinement with each other. This drum 17 is positioned upon the projecting end of the shaft 12, at which time the set screw 20 may be passed through the threaded openings 19 so that when the screw is rotated so as to draw the ears 18 toward each other the drum will be clamped upon the shaft 17 and thereby the arm will be positively retained in a set position upon the shaft. A strand 21 having a crank end 22 extends from the arm 16 and this crank end 22 terminates in a lip 23 for purposes to be hereinafter set forth.

A solenoid 24 is carried upon the side portion of the back 1 and upon the rear surface of the back so that the indicator will be provided with a pair of solenoids, as clearly disclosed in Fig. 2. A clamp 25 having feet 26 is retained upon the back 1 by means of the securing members 27. A clamp is employed so as to embrace each of the solenoids 24, whereby these solenoids will be fixedly retained in their correct positions upon the rear portion of the back 1. A core 28 passes into each of the solenoids 24, and to each of the cores 28 there is fixedly secured a pitman 29. This pitman 29 is provided with an opening 30 adjacent its free end so as to allow the free end of the pitman to be slipped over lip 23 of the strand 21 whereby the pitman will engage the crank portion 22 of the strand 21. Thus it will be seen that when either core is drawn into its particular solenoid the pitman connected to this particular core will in turn draw upon the strand 21 so that the arm 16 will impart rotary motion to the shaft 12 and in this manner swing the indicator 13 in a desired direction.

It should, of course, be understood that the indicator is to be in condition to be operated at any hour of the day or night although it is only intended to allow the lamp 11 to burn during the night. In order to allow the lamp to burn the wire 31 extends from the lamp to the switch 32. From this switch 32 there extends a wire 33 connected to the binding post 34. A wire 35 extends from the binding post 34 to the batteries 36. From these batteries 36 there extends a wire 37 connected to one of the solenoids 24. A branch wire 38 is connected to the wire 37 and is in turn connected to the wire 39 extending from the remaining solenoid to the lamp 11. Thus it will be seen that when the switch 32 is closed the current for lighting the lamp will pass from the wires 33 and 35 through the batteries 36 and then through the wires 37, 38 and 39 to the socket of the lamp 11 and from the wire 31 to the switch 32 thereby forming a complete circuit. In this manner it will be seen that the lamp will continue to burn as long as the switch 32 is closed, and at this time either of the solenoids may be operated for swinging the indicator 13 in a desired direction. Suppose at this time it is desired to swing the indicator in a certain direction. In order to do this it is necessary to energize one of the solenoids 24 so as to cause the core 28 thereof to be drawn thereinto. If for instance, it is desired to energize the solenoid adjacent the left hand portion of Fig. 6, the switch 40 is closed. This action will cause a circuit to be formed through the wire 35 and batteries 36 and through the wires 37, 38, and 39. It will be seen that when the light is burning the circuit will be split when it passes from the wire 39, as the current will pass to the lamp 11 and at the same time will pass to the solenoid 24 adjacent the left hand portion of Fig. 6.

The current after passing through the solenoid will return over the wire 41 to the switch 40. As long as the switch is retained in a closed position the solenoid 24 adjacent the left-hand portion of Fig. 6 will be energized and therefore, will cause the indicator 13 to remain in the position to which it is turned inasmuch as the core 28 will be held within the solenoid. As soon, however, as the circuit is broken by the breaking of the contact through the switch 40 the weight of the indicator will cause the same to swing downwardly toward its normal position, as disclosed in Fig. 1, inasmuch as the solenoid at this time will be energized and the core 28 will be allowed to pass partially therefrom as shown in Fig. 2. If, however, it is desired to swing the indicator in the opposite direction the switch 42 may be closed. This action will cause the circuit to be formed through the wire 43 connected to the switch 42 and the binding post 34. Current will then pass from the wire 33 to the wire 35, to the batteries 36. From the batteries 36 current will pass over the wire 37 through the solenoid 24 adjacent the right hand portion of Fig. 6. Of course, the current will split and a portion of the same will pass over the wire 38 to pass to the lamp and over the circuit hereinbefore set forth. The current, however, passing into the solenoid from the wire 37 will after passing from the solenoid and energizing the same return therethrough over the wire 44 to the switch 42. When the device is in use in the day time, of course, the switch 32 is swung to an inoperative position so as to break the circuit used in lighting the lamp 11 and in consequence full current will pass through either of the solenoids into which the same may be directed by the manipulation of the particular switch 40 or 42.

It is desirable to use an indicator as above described upon the front of the automobile or other vehicles as well as upon the rear thereof so that an approaching vehicle, pedestrians, or traffic policemen will know in which direction the vehicle provided with the indicator is about to turn, while a vehicle in the rear of the one provided with this indicator may also know in which direction the front vehicle is about to turn. Therefore, in order to allow this device to be in a convenient position for use the main switch board, as shown at 45, may be carried upon the vehicle in any convenient position, such for instance as being carried upon the steering wheel.

From the foregoing description it will be seen that a very efficient safety lamp and direction indicator has been provided which may be used either during the day or night, attaining the same advantages under all circumstances. It will further be seen that the lamp is carried so as to efficiently light the indicator, while the solenoids and arm and the connections therefor are constructed so as to quickly and efficiently swing the indicator when it is desired to operate the same simply by the manipulation of an ordinary switch and the closing of the circuit through a desired solenoid, which will cause the indicator to be swung in a desired direction.

What is claimed is:

In a device of the class described, the combination of a supporting back, a shaft rotatably carried by said back, an indicator carried by said shaft, an arm carried upon said shaft, a drum formed upon said arm, parallel ears extending from said drum, a set screw passing through said ears whereby said ears may be drawn together thereby clamping said drum upon said shaft, whereby said drum will be releasably carried in a set position upon said shaft, a strand extending from said arm, said strand provided with a crank portion terminating in a lip, solenoids carried by said back, cores carried by said solenoids, pitmen pivotally secured to said solenoids, said pitmen provided with openings in their free ends, said crank portion of said strand extending through said openings, said lip holding said pitmen upon said crank portion, and means for energizing one of said solenoids at a time whereby the core carried by the particular solenoid will be drawn thereinto so as to cause the particular pitman to draw upon the crank portion of said strand so as to swing said arm whereby said shaft will be swung so as to move said indicator in a desired direction.

In testimony whereof I hereunto affix my signature.

ANDREW T. BUTKEY.

Witnesses:
HOWARD D. CHAAS,
DAVID E. JONES.